(12) United States Patent
Wang et al.

(10) Patent No.: US 12,409,844 B2
(45) Date of Patent: Sep. 9, 2025

(54) INTENTION PREDICTION IN SYMMETRIC SCENARIOS

(71) Applicant: PlusAI, Inc., Santa Clara, CA (US)

(72) Inventors: Yu Wang, San Jose, CA (US); Yongzuan Wu, San Francisco, CA (US)

(73) Assignee: PlusAI, Inc., Santa Clara, CA (US)

(*) Notice: Subject to any disclaimer, the term of this patent is extended or adjusted under 35 U.S.C. 154(b) by 51 days.

(21) Appl. No.: 18/430,913

(22) Filed: Feb. 2, 2024

(65) Prior Publication Data

US 2024/0425066 A1 Dec. 26, 2024

Related U.S. Application Data

(63) Continuation of application No. 18/214,418, filed on Jun. 26, 2023, now Pat. No. 11,926,335.

(51) Int. Cl.
*B60W 50/06* (2006.01)
*B60W 30/18* (2012.01)
*B60W 60/00* (2020.01)

(52) U.S. Cl.
CPC ...... *B60W 50/06* (2013.01); *B60W 30/18163* (2013.01); *B60W 60/0027* (2020.02); *B60W 2554/4045* (2020.02)

(58) Field of Classification Search
CPC ............ B60W 50/06; B60W 60/0027; B60W 30/18163; B60W 2554/4045
See application file for complete search history.

(56) References Cited

U.S. PATENT DOCUMENTS

| | | | | |
|---|---|---|---|---|
| 2007/0248245 | A1* | 10/2007 | Aimura | G06V 20/58 382/104 |
| 2021/0067745 | A1* | 3/2021 | Rosenberg | G06V 10/764 |
| 2021/0261128 | A1* | 8/2021 | Shah | G06V 20/58 |
| 2022/0051416 | A1* | 2/2022 | Cao | G06T 7/0012 |
| 2022/0171981 | A1* | 6/2022 | Georgis | G06V 20/63 |
| 2022/0410931 | A1* | 12/2022 | Jost | G06V 10/60 |
| 2023/0239438 | A1* | 7/2023 | Kim | G06V 10/95 701/300 |
| 2024/0166201 | A1* | 5/2024 | Wang | B60W 60/0027 |

* cited by examiner

*Primary Examiner* — Naeem Taslim Alam
(74) *Attorney, Agent, or Firm* — Sheppard Mullin Richter & Hampton LLP

(57) ABSTRACT

Methods, systems, and non-transitory computer-readable media are configured to perform operations comprising determining a symmetric scenario for a scenario; training a first machine learning model for the scenario based on first training data generated from second training data for the symmetric scenario; and generating a prediction for the scenario based on the first machine learning model.

20 Claims, 11 Drawing Sheets

INTENTION PREDICTION IN SYMMETRIC SCENARIOS

CROSS-REFERENCE TO RELATED APPLICATIONS

This application is a continuation of U.S. patent application Ser. No. 18/214,418, filed on Jun. 26, 2023 and entitled "INTENTION PREDICTION IN SYMMETRIC SCENARIOS", which is incorporated in its entirety herein by reference.

FIELD OF THE INVENTION

The present technology relates to autonomous systems. More particularly, the present technology relates to machine learning applications in various scenarios for vehicle control.

BACKGROUND

An autonomous system for navigation of a vehicle can plan and control motion for the vehicle. The planning and control functions of the autonomous system rely on data about the vehicle and an environment in which the vehicle is travelling, including the position and movement of other vehicles and objects. The performance of the planning and control functions can depend on such data as the state of the vehicle and the conditions of the environment change. The performance of these functions can be especially challenging in different situations. As one example involving a merge situation, a vehicle travelling in a lane must be able to reliably anticipate whether another vehicle will merge into the lane in front of the vehicle or behind the vehicle.

SUMMARY

Various embodiments of the present technology can include methods, systems, and non-transitory computer-readable media configured to perform operations comprising determining a symmetric scenario for a scenario; training a first machine learning model for the scenario based on first training data generated from second training data for the symmetric scenario; and generating a prediction for the scenario based on the first machine learning model.

In some embodiments, the operations further comprise generating the first training data based on a relabel of the second training data.

In some embodiments, the generating the first training data comprises relabeling a first object in the second training data to a first ego vehicle; and relabeling a second ego vehicle in the second training data to a second object.

In some embodiments, generating the first training data comprises relabeling a first prediction associated with the symmetric scenario to a second prediction associated with the scenario.

In some embodiments, the operations further comprise determining unlabeled training data for the scenario; and training the first machine learning model to determine a transformation that converts instances of the first training data from a first feature space associated with the first training data to a second feature space associated with the unlabeled training data.

In some embodiments, the transformation is based on minimizing differences between a first feature distribution in the first feature space and a second feature distribution in the second feature space.

In some embodiments, the operations further comprise determining unlabeled training data for the scenario; and training the first machine learning model to minimize a loss function between instances of the first training data and instances of the unlabeled training data.

In some embodiments, the operations further comprise training a second machine learning model based on labeled training data for the scenario or unlabeled training data for the scenario; and applying a portion of the first machine learning model to the second machine learning model.

In some embodiments, the prediction is generated based on dynamics associated with an object detected in an environment, and wherein the prediction includes a predicted action performed by the object.

In some embodiments, the scenario is an active merge scenario, and wherein the symmetric scenario is a passive merge scenario.

It should be appreciated that many other embodiments, features, applications, and variations of the present technology will be apparent from the following detailed description and from the accompanying drawings. Additional and alternative implementations of the methods, non-transitory computer-readable media, systems, and structures described herein can be employed without departing from the principles of the present technology.

Figure 1:
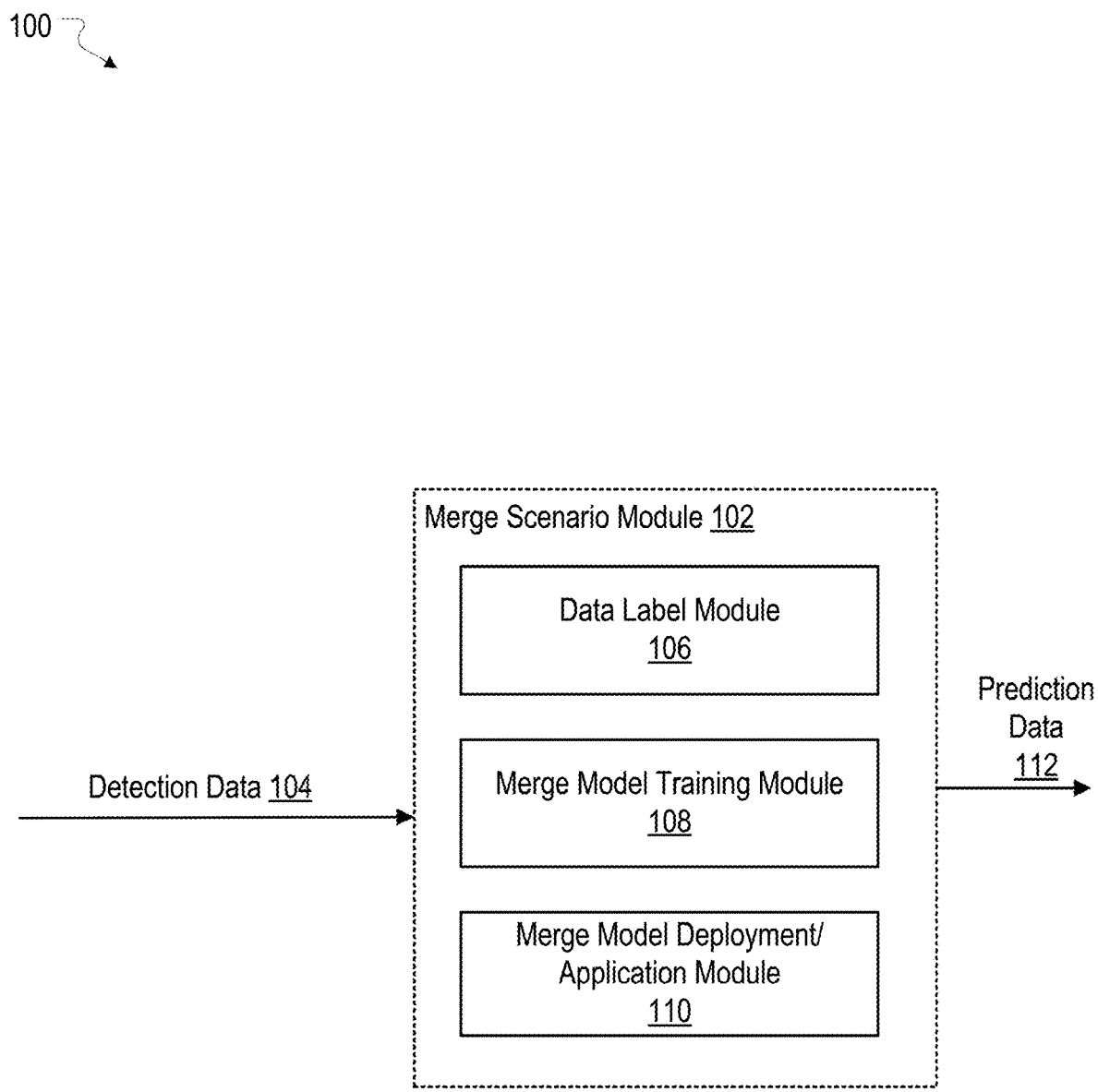
FIG. 1 illustrates an example system associated with machine learning applications in various scenarios, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Active Merge Intention Prediction

An autonomous system for navigation of a vehicle can plan and control motion for the vehicle. The planning and control functions of the autonomous system rely on data about the vehicle and an environment in which the vehicle is travelling, including the position and movement of other vehicles and objects. The performance of the planning and control functions can depend on such data as the state of the vehicle and the conditions of the environment change.

Understanding an environment in which a vehicle having an autonomous system for navigation (e.g., ego vehicle) is travelling is fundamental to planning and control functions of the vehicle. For example, a truck travelling in an environment can plan a safe route to travel in the environment based on an understanding of the environment. An understanding of an environment can involve identifying obstacles such as other vehicles, pedestrians, traffic signals, objects, etc. An autonomous system for navigation of a vehicle can plan and control motion of the vehicle in response to the identified obstacles. The understanding of the environment can also involve predictions for obstacles identified in the environment. The predictions for the obstacles can describe a predicted action related to the obstacles, such as a predicted path an obstacle will follow. The autonomous system for navigation of the vehicle can plan and control the motion of the vehicle as appropriate in response to the predictions for the obstacles.

However, under conventional approaches, generation of predictions in various scenarios poses various technological challenges. For example, a merge scenario can involve a first vehicle driving on a main road (e.g., roadway, freeway, highway) and a second vehicle driving on a ramp (on ramp) that merges with the main road. For the first vehicle to safely drive, predictions need to be made with respect to the second vehicle, such as whether the second vehicle will yield to and follow behind the first vehicle or try to merge in front of the first vehicle. For the second vehicle to safely drive, predictions need to be made with respect to the first vehicle, such as whether the first vehicle will yield to the second vehicle or not yield to the second vehicle. In this example merge scenario, training data regarding motion of the first vehicle as the second vehicle merges onto the main road may be limited in quantity or difficult to acquire. In this regard, while the training data reflecting operation of the second vehicle in an autonomous mode is desirable, in reality vehicles merging onto a main road as described rarely operate in an autonomous mode of navigation. As a result, an autonomous system for navigation may be sufficiently capable of generating the predictions that need to be made about motion of the second vehicle, but insufficiently capable of generating the predictions that need to be made about motion of the first vehicle. Thus, conventional approaches of autonomous systems for navigation face various challenges with respect to generation of predictions in various scenarios.

The present technology provides improved approaches for generation of predictions in various scenarios that overcome the aforementioned and other technological challenges. In various embodiments, the present technology provides approaches that can be used individually or in combination to train a machine learning model to generate predictions for a scenario. The scenario can be, for example, a scenario for which there is a lack of training data to train the machine learning model. In the first approach, a machine learning model can be trained for a scenario based on simulated training data. The simulated training data for the scenario can be simulated based on relabeling of training data for symmetric, or similar, scenarios. For example, a machine learning model can be trained for an active merge scenario in which an ego vehicle merges into a main road. The machine learning model can be trained to generate, for an ego vehicle on an on-ramp to a main road (e.g., roadway, freeway, highway), predictions with respect to a lagging vehicle on the main road based on training data for a symmetric scenario (e.g., passive merge scenario in which another vehicle merges into a main road on which the ego vehicle is traveling). The training data for the symmetric scenario can involve an ego vehicle on a main road and a merging vehicle on an on-ramp to the main road. The training data can be relabeled to simulate training data to train the machine learning model to generate predictions with respect to lagging vehicles for the active merge scenario. As illustrated in this example, this first approach can support quick and efficient training of a machine learning model without using additional training data.

In a second approach, a first machine learning model can be trained for a scenario based on simulated training data. A second machine learning model can be trained for the scenario based on labeled training data. Portions of the first machine learning model can be applied to the second machine learning model as part of the training of the second machine learning model. For example, a first machine learning model can be trained for an active merge scenario. The first machine learning model can be trained to generate, for an ego vehicle on an on-ramp to a main road, predictions with respect to a lagging vehicle on the main road based on simulated training data. The simulated training data can include relabeled training data from a symmetric scenario. The symmetric scenario can involve an ego vehicle on a main road and a merging vehicle on an on-ramp to the main road. A second machine learning model can be trained for the active merge scenario based on labeled training data. The labeled training data can include captured data of active merge scenarios that have been labeled to identify an ego vehicle and a lagging vehicle. Portions of the first machine learning model can be applied to the second machine learning model. For example, parameters and weights learned by the first machine learning model can be utilized by the second machine learning model. The application of the portions of the first machine learning model to the second machine learning model can be tested based on the labeled training data. As illustrated in this example, this second approach allows a machine learning model to be trained on a relatively smaller amount of labeled training data by using portions of another machine learning model trained using simulated training data.

In a third approach, a machine learning model can be trained to generate predictions for a scenario based on simulated training data and unlabeled training data. The simulated training data can be simulated based on a symmetric, or similar, scenario. The unlabeled training data can involve captured data of the scenario without labels applied to the captured data. The machine learning model can be trained based on the simulated training data and then adjusted to perform on the unlabeled training data by learning parameters and weights to minimize discrepancies between the simulated training data and the unlabeled training data. For example, a machine learning model can be trained for an active merge scenario. The machine learning model can be trained to generate, for an ego vehicle on an on-ramp to a main road, predictions with respect to a lagging vehicle on the main road based on simulated training data. The simulated training data can include relabeled training data from a symmetric scenario. The symmetric scenario can involve an ego vehicle on a main road and a merging vehicle on an on-ramp to the main road. The machine learning model can be trained further based on unlabeled training data. The unlabeled training data can include captured data of active merge scenarios without labels applied to the captured data. The machine learning model can be trained further to learn parameters and weights to minimize discrepancies between the simulated training data and the unlabeled training data. For example, the machine learning model can be trained to learn a transformation that converts the simulated training data to match a domain of the unlabeled training data. The machine learning model can be tested based on the simulated training data and the unlabeled training data. As illustrated in this example, this third approach allows a machine learning model to be trained on unlabeled training data by using simulated training data. Thus, the present technology provides improved approaches for generation of prediction in various scenarios using machine learning methodologies. These and other inventive features and related advantages of the various embodiments of the present technology are discussed in more detail herein.

FIG. 1 illustrates an example system 100 including a merge scenario module 102, according to some embodiments of the present technology. In some embodiments, the merge scenario module 102 can provide support for various functions of an autonomous system of navigation of any type of vehicle (or ego vehicle), such as a truck. The merge scenario module 102 can generate prediction data 112. The prediction data 112 can include, for example, a prediction regarding whether a vehicle on a road will yield or not yield to an ego vehicle that is merging onto the road. The merge scenario module 102 can support or be implemented as part of a planning function of an autonomous system of a vehicle, such as a prediction and planning module 616 of an autonomous system 610 of FIG. 6, as discussed in more detail below. Alternatively or additionally, the merge scenario module 102 can support or be implemented as part of a perception function of an autonomous system of a vehicle, such as a perception module 612 of the autonomous system 610 of FIG. 6, as discussed in more detail below. The merge scenario module 102 can generate the prediction data 112 based on various data, such as detection data 104, which are discussed in more detail below. The merge scenario module 102 can generate the prediction data 112 based on various machine learning methodologies. For example, the merge scenario module 102 can train a machine learning model to generate prediction data 112 based on the detection data 104. While generation of predictions for merge scenarios is discussed herein as an example application of the present technology, various other applications, such as generation of predictions for various other scenarios are possible in accordance with the present technology.

In some embodiments, some or all of the functionality performed by the merge scenario module 102 may be performed by one or more computing systems implemented in a vehicle. In some embodiments, some or all of the functionality performed by the merge scenario module 102 may be performed by one or more backend computing systems (e.g., remote from a vehicle). In some embodiments, some or all of the functionality performed by the merge scenario module 102 may be performed by one or more computing systems associated with (e.g., carried by) one or more users riding in a vehicle. In some embodiments, some or all data processed and/or stored by the merge scenario module 102 can be stored in a data store (e.g., local to the merge scenario module 102) or other storage system (e.g., cloud storage remote from merge scenario module 102). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the merge scenario module 102 can be implemented in any suitable combinations. Functionalities of the merge scenario module 102 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The merge scenario module 102 can include a data label module 106. The data label module 106 can generate labels for training data. In general, labels for training data can identify various features in the training data. The various features can include, for example, obstacles or objects depicted in the training data, dynamics such as velocity, acceleration, position, pose, direction, and trajectory associated with the obstacles or objects depicted in the training data, and context or scenarios associated with the training data. The labels for the training data can include classifications or predictions associated with the training data. For example, an instance of training data can be labeled to identify features depicted in the instance of training data. The features can include, for example, an object, a trajectory of the object, and a scenario associated with the instance of training data. The instance of training data can be labeled in accordance with a desired prediction that is to be made based on the features in the instance of training data. A machine learning model can be trained based on training data and labels for the training data. For example, a machine learning model can be trained to generate predictions for a merge scenario. The machine learning model can be trained for the merge scenario based on training data. The training data can include, for example, captured sensor data from instances of the merge scenario. The training data can be labeled to identify certain features of the captured sensor data, such as vehicles depicted in the training data as well as velocities and trajectories associated with the vehicles depicted in the training data. The training data can be associated with labels indicating the actual or desired outcomes of the merge scenarios described by the training data, such as whether a vehicle will yield or not yield to a merging vehicle. The training data can be provided to the machine learning model as input. The machine learning model can generate predictions based on the training data. The generated predictions can be compared with the labels to determine an accuracy of the generated predictions. The machine learning model can be further trained or refined to improve the accuracy of the machine learning model.

The data label module 106 can relabel training data to generate simulated training data. In some cases, scenarios can be symmetric. Symmetric scenarios involve similar obstacles or similar objects behaving in similar manners. For example, similarity can be determined based on quantitative descriptions of obstacles and their behavior (e.g., size, position, velocity, acceleration, etc.) in different scenarios that fall within threshold difference values. The symmetric scenarios may differ with respect to an ego (e.g., ego vehicle) in the scenarios. For example, an active merge scenario and a passive merge scenario are symmetric scenarios. In the active merge scenario, an ego vehicle is travelling on an on-ramp to merge with a main road, and another vehicle is travelling on the main road approaching where the on-ramp and the main road converge. In the passive merge scenario, the ego vehicle is travelling on the main road approaching where the on-ramp and the main road converge, and another vehicle is travelling on the on-ramp to merge with the main road. As another example, an active lane change scenario and a passive lane change scenario are symmetric scenarios. In the active lane change scenario, an ego vehicle is changing from one lane to another lane, in front of another vehicle travelling in the other lane. In the passive lane change scenario the ego vehicle is travelling in a lane and the other vehicle is changing to the lane, in front of the ego vehicle, from another lane. The data label module 106 can relabel features in training data associated with a scenario to generate simulated training data associated with an associated symmetric scenario. The features in the training data can be relabeled to change an ego vehicle in the training data to generate the simulated training data. Desired classifications or predictions for the training data can be relabeled based on differences between the scenario and the symmetric scenario. For example, an ego vehicle in a scenario can be relabeled as an obstacle (e.g., another vehicle) and the dynamics associated with the ego vehicle in the scenario can be relabeled as a desired prediction for the obstacle to generate simulated training data of a symmetric scenario.

As an example of the above, simulated training data for an active merge scenario can be generated based on training data for a passive merge scenario. In the training data for the passive merge scenario, an ego vehicle is navigating a main road that converges with an on-ramp to the main road. A lead vehicle is navigating the main road ahead of the ego vehicle. A merging vehicle is navigating the on-ramp to the main road. The training data for the passive merge scenario includes three labels indicating where the merging vehicle will merge. A first label predicts the merging vehicle merges ahead of the lead vehicle. A second label predicts the merging vehicle merges between the lead vehicle and the ego vehicle. A third label predicts the merging vehicle merges behind the ego vehicle. Various instances of the training data for the passive merge scenario can include the first label, the second label, or the third label depending on various factors, such as dynamics associated with the lead vehicle, dynamics associated with the merging vehicle, and dynamics associated with the ego vehicle. The simulated training data for the active merge scenario can be generated by relabeling the training data for the passive merge scenario. The merging vehicle in the passive merge scenario can be relabeled as the ego vehicle in the active merge scenario. The ego vehicle in the passive merge scenario can be relabeled as a lagging vehicle in the active merge scenario. Accordingly, the training data for the active merge scenario includes the lead vehicle navigating the main road ahead of the lagging vehicle and the ego vehicle navigating the on-ramp to the main road. Various instances of the simulated training data for the active merge scenario can include two prediction labels for whether the lagging vehicle yields to the ego vehicle (i.e., permits the ego vehicle to proceed in front of the lagging vehicle). A first label predicts the lagging vehicle yields to the ego vehicle. A second label predicts the lagging vehicle does not yield to the ego vehicle. Instances of the training data for the passive merge scenario labeled with predictions that the merging vehicle merges ahead of the lead vehicle and predictions that the merging vehicle merges between the lead vehicle and the ego vehicle can be relabeled for the active merge scenario with the first label that predicts the lagging vehicle yields to the ego vehicle. Instances of the training data for the passive merge scenario labeled with predictions that the merging vehicle merges behind the ego vehicle can be relabeled for the active merge scenario with the second label that predicts the lagging vehicle does not yield to the ego vehicle. Additional examples are described in FIGS. 2A-2B. Many variations are possible.

The merge scenario module 102 can include a merge model training module 108. The merge model training module 108 can train one or more machine learning models based on various approaches. In a first approach, the merge model training module 108 can train a machine learning model for a scenario based on simulated training data. The simulated training data can be generated from training data for a symmetric scenario associated with the scenario. The machine learning model can be trained to generate a prediction for the scenario based on inputs to the machine learning model. The inputs can include, for example, dynamics of vehicles involved in the scenario. In training of the machine learning model, the simulated training data is provided to the machine learning model. Predictions generated by the machine learning model are evaluated against labels of the simulated training data. The machine learning model can be trained, for example, to minimize a loss function between the predictions generated by the machine learning model and the labels of the simulated training data. For example, a machine learning model can be trained for active merge scenarios based on simulated training data generated from training data for passive merge scenarios. The machine learning model can be trained, for example, to generate predications as to whether or not a lagging vehicle will yield to an ego vehicle based on dynamics of the ego vehicle and dynamics of the lagging vehicle. The predictions generated by the machine learning model can be evaluated against labels of the simulated training data. For example, an instance of the simulated training data can be associated with a label that indicates whether a lagging vehicle yields to an ego vehicle. The instance of the simulated training data can be provided to the machine learning model. The machine learning model can generate a prediction that the lagging vehicle yields to the ego vehicle based on dynamics associated with the lagging vehicle and dynamics associated with the ego vehicle. In this example, because the prediction generated by the machine learning model matches the label associated with the instance of the simulated training data, the machine learning model can be determined to have accurately evaluated the instance of the simulated training data.

In a second approach, the merge model training module 108 can train a first machine learning model for a scenario based on simulated training data and applies portions of the first machine learning model to a second machine learning model that is trained for the scenario based on labeled training data. The first machine learning can be trained, for example, based on the first approach described above. The labeled training data with which the second machine learning model is trained can be based on captured data associated with the scenario for which the second machine learning model is trained. The captured data can be labeled to identify features in the captured data and indications associated with the captured data regarding merge outcomes relating to whether a vehicle will yield or not yield to another vehicle (e.g., ego vehicle). In some cases, the simulated training data can include more instances of simulated training data than instances of labeled training data included in the labeled training data. The merge model training module 108 can apply (e.g., through transfer learning) portions of the first machine learning model to the second machine learning model. In some cases, application of the portions of the first machine learning model to the second machine learning model may depend on the first machine learning model and the second machine learning model having the same or similar architectures. The portions of the first machine learning model to apply to the second machine learning model can include, for example, parameters, weights, and layers of the first machine learning model. Application of the portions of the first machine learning model to the second machine learning model can include, for example, replacing parameters, weights, or layers of the second machine learning model with corresponding parameters, weights, or layers of the first machine learning model. In some cases, application of the portions of the first machine learning model to the second machine learning model can include, for example, altering (e.g., averaging, reducing, increasing) parameters, weights, or layers of the second machine learning model based on corresponding parameters, weights, or layers of the first machine learning model. Once the second machine learning model is trained based on the labeled training data and portions of the first machine learning model have been applied to the second machine learning model, the second machine learning model can be evaluated based on the labeled training data. Evaluation of the second machine learning model can involve comparing predictions generated by the second machine learning model with labels of the labeled training data. Based on the evaluation, further application of the portions of the first machine learning model can be performed to further train or refine the second machine learning model to minimize a loss function between the predictions generated by the second machine learning model and the labels of the labeled training data.

For example, a first machine learning model can be trained for active merge scenarios based on simulated training data generated from training data for passive merge scenarios. A second machine learning model can be trained for active merge scenarios based on labeled training data of active merge scenarios. In this example, the labeled training data of active merge scenarios may be insufficient to fully train the second machine learning model. To account for the lack of labeled training data of active merge scenarios, portions of the first machine learning model can be applied to the second machine learning model. For example, provided the first machine learning model and the second machine learning model are similarly structured neural networks, a layer from the first machine learning model can be used in place of a corresponding layer in the second machine learning model. The second machine learning model can be evaluated based on the labeled training data of the active merge scenarios to determine whether the application of the layer from the first machine learning model to the second machine learning model improved accuracy of the second machine learning model. For example, the second machine learning model can generate a prediction based on an instance of the labeled training data. The prediction can be compared with a label identifying a desired prediction associated with the instance of the labeled training data. Based on the comparison, a determination of whether the application of the layer from the first machine learning model improved the accuracy of the second machine learning model can be made. The determination can be based on whether the generated prediction matches the label identifying the desired prediction. Other portions of the first machine learning model can be further applied to the second machine learning model to further improve the accuracy of the second machine learning model.

In a third approach, the merge model training module 108 can train a machine learning model for a scenario based on simulated training data and unlabeled training data. The simulated training data can be generated based on a symmetric scenario. The unlabeled training data can include captured data of the scenario without labels applied to the captured data. The merge model training module 108 can train the machine learning model for the scenario based on the simulated training data, for example, based on the first approach described above. The merge model training module 108 can further train the machine learning model for the scenario based on the unlabeled training data. Training the machine learning model for the scenario based on the unlabeled training data can involve training the machine learning model to determine a first feature space (e.g., reproducing kernel Hilbert space) associated with the simulated training data and a second feature space associated with the unlabeled training data. The machine learning model can be trained to determine a transformation that converts instances of the simulated training data from the first feature space to the second feature space. The transformation can be based on minimizing differences (e.g., maximum mean discrepancy, mean value distance) between a first feature distribution in the first feature space and a second feature distribution in the second feature space. Determining the transformation can involve determining parameters and weights for the machine learning model such that evaluations of instances of the simulated training data by the machine learning model match, or are similar to (e.g., within a threshold value range), evaluations of instances of the unlabeled training data similar to the instances of the simulated training data. The similarity of the instances of the simulated training data and the instances of the unlabeled training data can be determined based on a distance between the instances of the simulated training data and the instances of the unlabeled training data in the second feature space. Instances of the simulated training data that are within a threshold distance to the instances of the unlabeled training data in the second feature space can be determined to be similar. Based on the transformation, the machine learning model can be trained based on the simulated training data to evaluate the unlabeled training data. In some cases, the machine learning model can be trained guided by a loss function based on differences between instances of the simulated training data and instances of the unlabeled training data. The loss function can enforce predictions close to a ground truth and encourage instances of the simulated training data and the unlabeled training data to be non-discriminative. The machine learning model can be trained to minimize the loss function. Minimizing the loss function can involve determining parameters and weights for the machine learning model such that inputs to the machine learning model from the simulated training data are evaluated as the same or similar (e.g., within a threshold value range) to inputs to the machine learning model from the unlabeled training data. Based on the minimization of the loss function, the machine learning model can be trained based on the simulated training data to evaluate the unlabeled training data.

For example, a machine learning model can be trained for active merge scenarios based on simulated training data generated from passive merge scenarios. The machine learning model can be further trained based on unlabeled training data that includes captured data from active merge scenarios. As the simulated training data is based on data captured from passive merge scenarios and the unlabeled training data is based on data captured from active merge scenarios, there may be differences between the simulated training data and the unlabeled training data. The machine learning model can be further trained by training the machine learning model to account for the differences between the simulated training data and the unlabeled training data. In this example, the machine learning model can be trained to determine a transformation to convert instances of the simulated training data from a first feature space associated with the simulated training data to instances of training data in a second feature space associated with the unlabeled training data. To determine the transformation, parameters and weights for the machine learning model are determined so that evaluations of instances of the simulated training data converted to the second feature space are the same or similar to evaluations of instances of the unlabeled training data that are within a threshold distance of the instances of the simulated training data in the second feature space. The machine learning model can be further trained or refined by adjusting the parameters and the weights for the machine learning model to increase the similarity of evaluations for instances of the simulated training data that are similar to (e.g., within a threshold distance of) instances of the unlabeled training data. Many variations are possible.

The merge scenario module 102 can include a merge model deployment/application model 110. The merge model deployment/application module 110 can use a machine learning model to generate a prediction, such as prediction data 112, based on captured data, such as detection data 104. The captured data can include, for example, obstacles or objects detected in an environment. The captured data can include, for example, dynamics associated with the obstacles or objects, such as velocity, acceleration, position, pose, direction, and trajectory. The captured data can include information describing a context of the environment or a scenario determined for the environment. The merge model deployment/application module 110 can provide the captured data as input to the machine learning model. The machine learning model can generate a prediction based on the captured data. The prediction can include a predicted action that may be performed by one of the obstacles or objects detected in the environment. The prediction can be provided, for example, to a planner to plan a safe route through the environment. For example, a machine learning model can be trained for active merge scenarios. An autonomous system of an ego vehicle navigating an on-ramp to a main road can capture sensor data for the on-ramp to the main road. The captured sensor data can indicate, for example, a lagging vehicle on the main road. The captured sensor data can indicate, for example, a trajectory of the lagging vehicle on the main road. The captured sensor data can be provided to the machine learning model. Based on the captured sensor data, the machine learning model can generate a prediction as to whether the lagging vehicle will yield or will not yield. The prediction can be provided to a planner of the autonomous system to plan a route that safely navigates the environment while accounting for the predicted behavior of the lagging vehicle. For example, the route may be associated with a trajectory that navigates the ego vehicle to be in front of the lagging vehicle or behind the lagging vehicle based on the prediction regarding whether or not the lagging vehicle will yield. Many variations are possible.

Figure 2A:
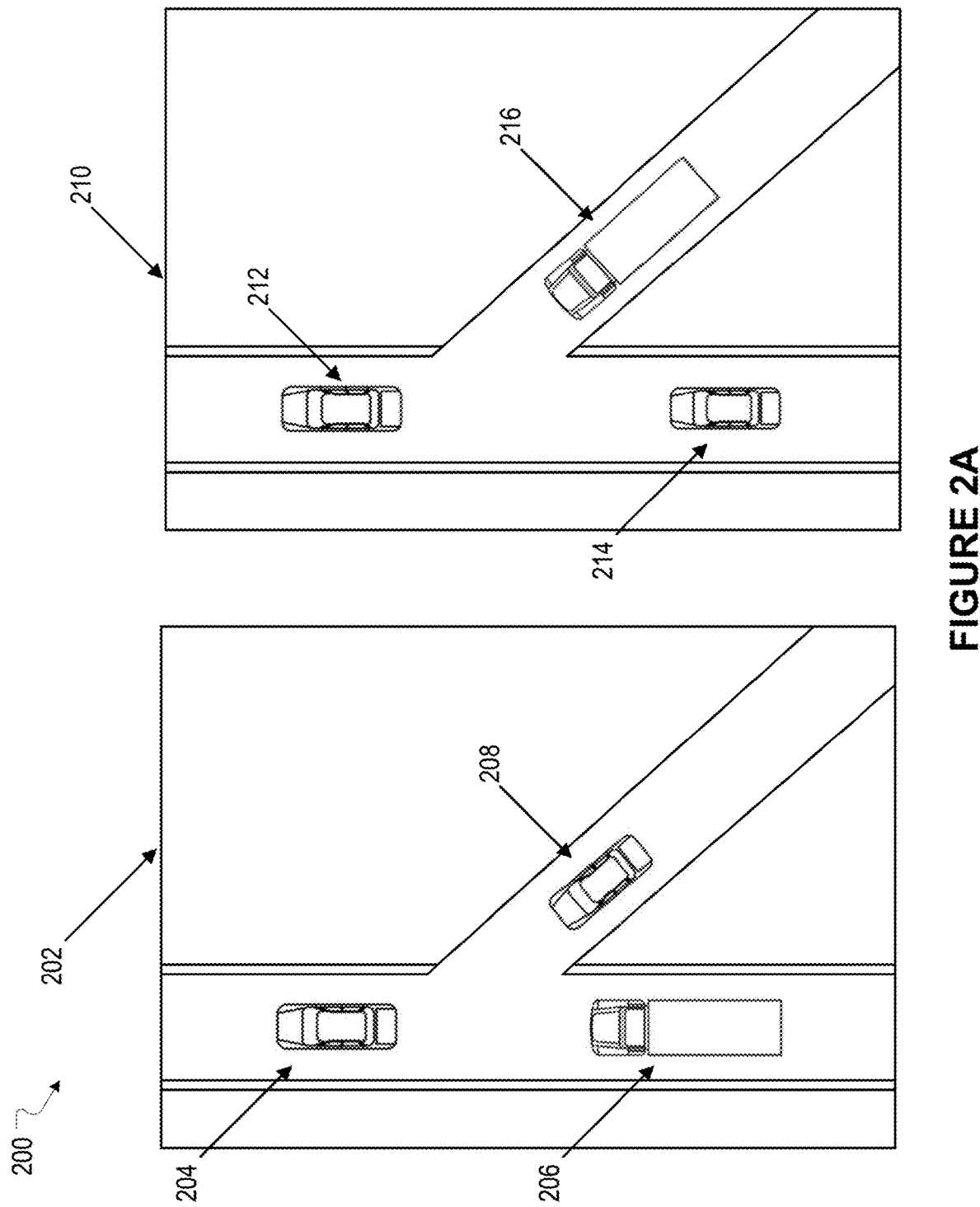
FIGS. 2A-2B illustrate examples associated with machine learning applications in various scenarios, according to embodiments of the present technology.
Figure 2B:
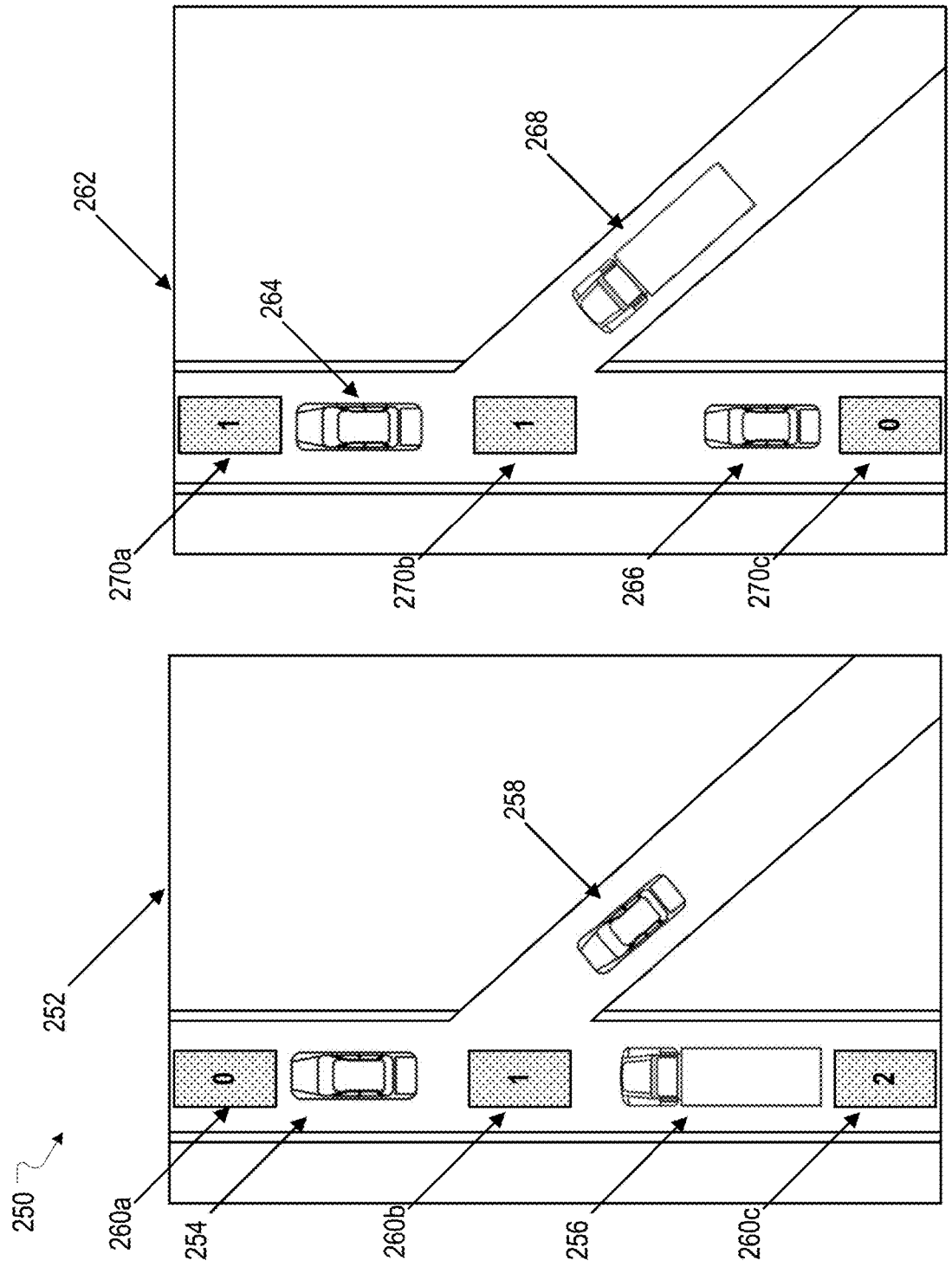

FIGS. 2A-2B illustrate examples associated with machine learning applications in various scenarios, according to some embodiments of the present technology. The various functionality described herein for machine learning applications in various scenarios can be performed by, for example, the merge scenario module 102 of FIG. 1. It should be understood that there can be additional, fewer, or alternative blocks, functionality, or steps performed in similar or alternative orders, or in parallel, based on the various features and embodiments discussed herein unless otherwise stated.

FIG. 2A illustrates an example 200 of generating labels to simulate a scenario based on a symmetric scenario. As illustrated in FIG. 2A, a passive merge scenario 202 includes an ego vehicle 206 on a main road behind a leading vehicle 204. On an on-ramp to the main road is a merging vehicle 208. The passive merge scenario 202 can be relabeled to simulate an active merge scenario 210. The active merge scenario 210 includes an ego vehicle 216 on an on-ramp to a main road. On the main road are a leading vehicle 212 and a lagging vehicle 214. As illustrated in this example, the active merge scenario 210 can be generated based on the passive merge scenario 202 by relabeling objects in the passive merge scenario 202 to change the ego vehicle 206 on the main road to the ego vehicle 216 on the on-ramp. Many variations are possible.

FIG. 2B illustrates an example 250 of generating labels to simulate a scenario based on a symmetric scenario. As illustrated in FIG. 2B, a passive merge scenario 252 includes an ego vehicle 256 on a main road behind a leading vehicle 254. On an on-ramp to the main road is a merging vehicle 258. The passive merge scenario 252 includes three labels for predictions that can be made with respect to the merging vehicle 258. A first label 260a can be associated with a value "0" corresponding with a prediction that the merging vehicle 258 will attempt to merge ahead of the leading vehicle 254. A second label 260b can be associated with a value "1" corresponding with a prediction that the merging vehicle 258 will attempt to merge ahead of the ego vehicle 256 and behind the leading vehicle 254. A third label 260c can be associated with a value "2" corresponding with a prediction that the merging vehicle 258 will attempt to merge behind the ego vehicle 256. The passive merge scenario 252 can be relabeled to simulate an active merge scenario 262. The active merge scenario 262 includes an ego vehicle 268 on an on-ramp to a main road. On the main road are a leading vehicle 264 and a lagging vehicle 266. The active merge scenario 262 includes two labels for predictions that can be made with respect to the lagging vehicle 266. A first label 270a, 270b can be associated with a value "1" corresponding with a prediction that the lagging vehicle 266 will yield to the ego vehicle 268. A second label 270*c* can be associated with a value "0" corresponding with a prediction that the lagging vehicle 266 will not yield to the ego vehicle 268. As illustrated in this example, the active merge scenario 262 can be generated based on the passive merge scenario 252 by relabeling predictions associated with the passive merge scenario 252 to change predictions made with respect to a merging vehicle 258 to predictions made with respect to a lagging vehicle 266. Many variations are possible.

Figure 3A:
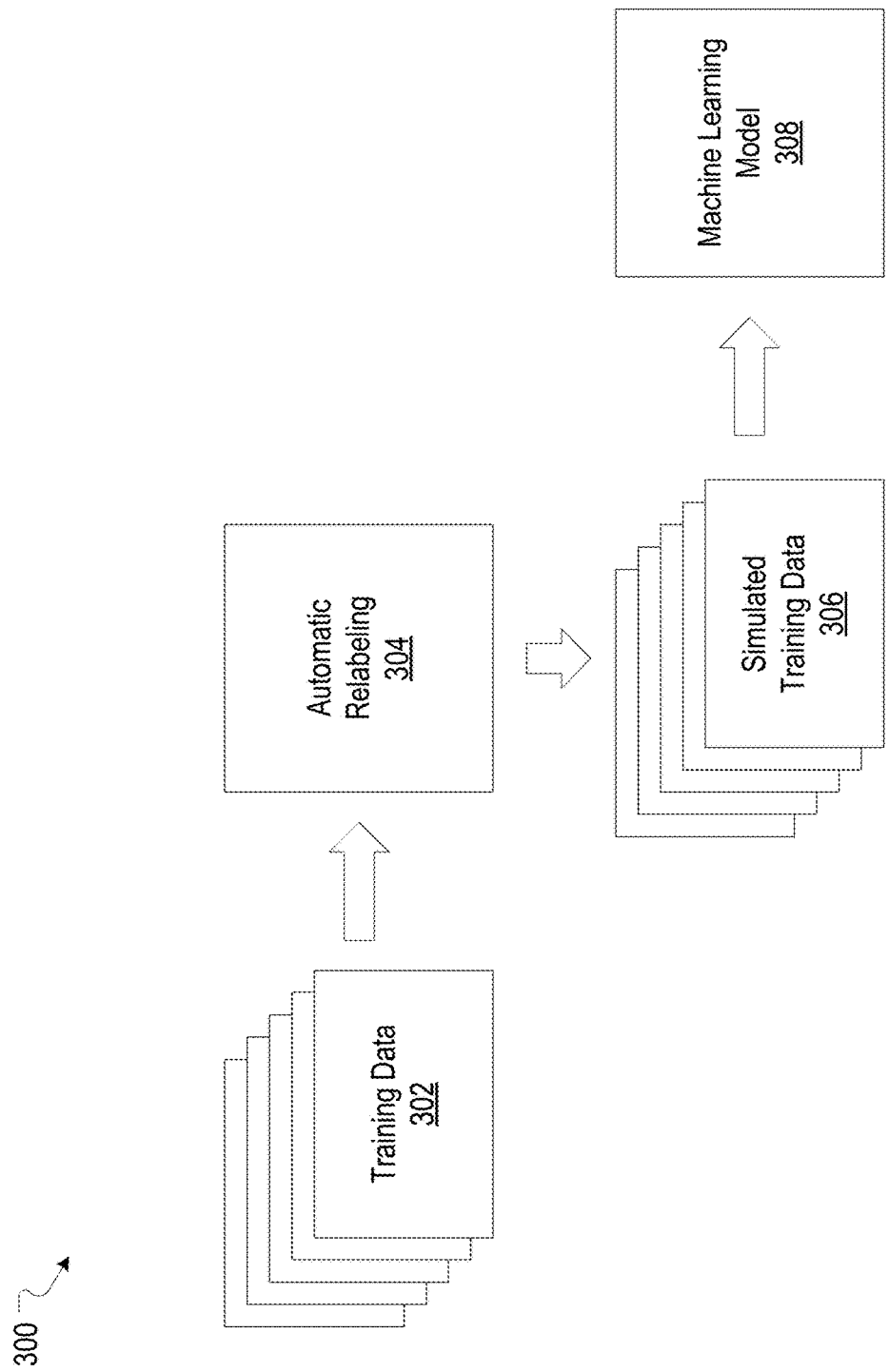
FIGS. 3A-3C illustrate example block diagrams associated with machine learning applications in various scenarios, according to embodiments of the present technology.
Figure 3B:
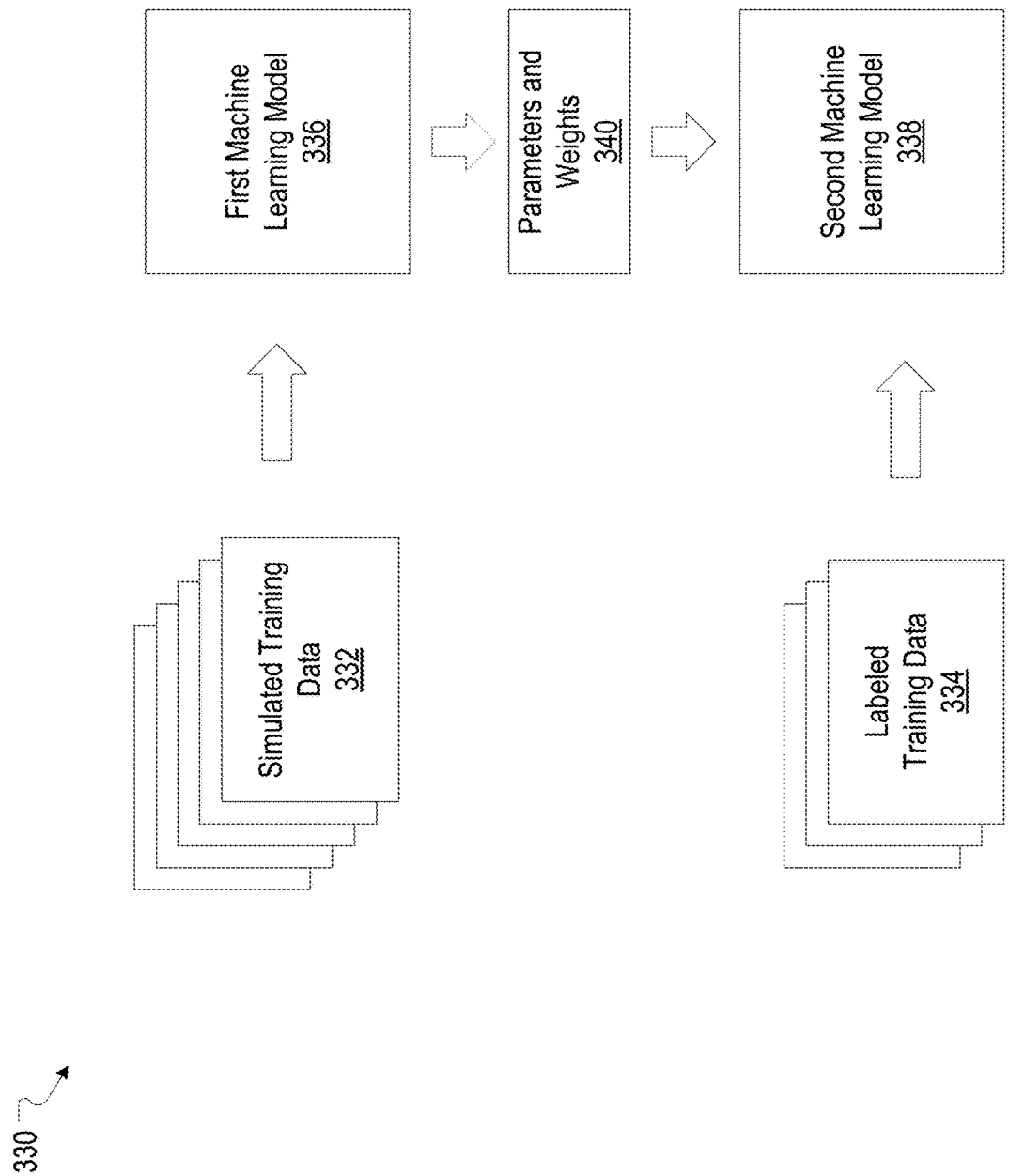
Figure 3C:
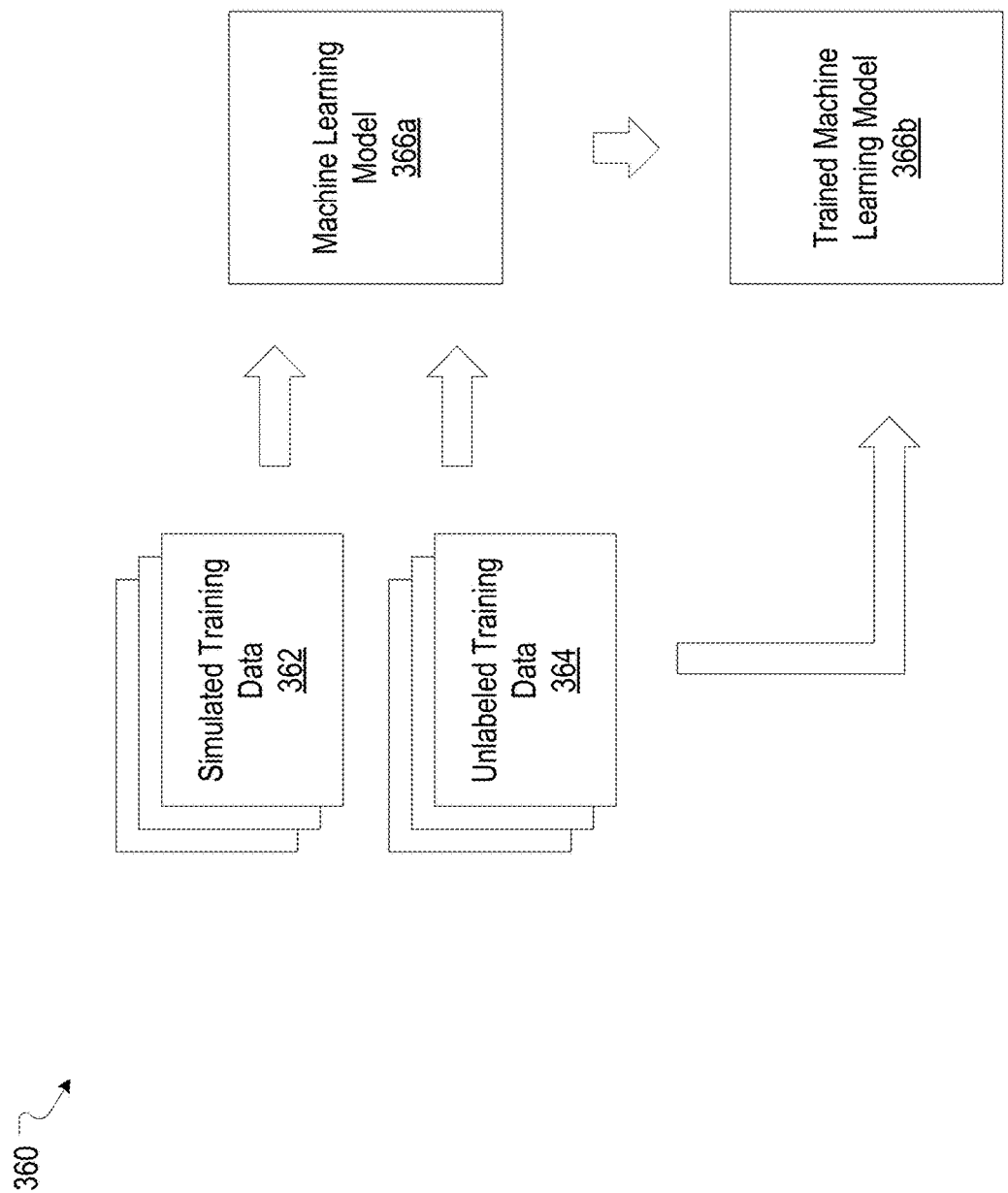

FIGS. 3A-3C illustrate example block diagrams associated with machine learning applications in various scenarios, according to some embodiments of the present technology. The various functionality described herein for machine learning applications in various scenarios can be performed by, for example, the merge scenario module 102 of FIG. 1. It should be understood that there can be additional, fewer, or alternative functionality or steps performed in similar or alternative orders, or in parallel, based on the various features and embodiments discussed herein unless otherwise stated.

FIG. 3A illustrates an example block diagram 300 associated with an approach to training a machine learning model for a scenario. The approach can include providing training data 302 for automatic relabeling 304. Simulated training data 306 can be generated based on automatic relabeling 304 of the training data 302. The simulated training data 306 can be provided to machine learning model 308 for training. As illustrated in this example, the machine learning model 308 can be trained in cases where instances of training data are not readily available. In these cases, the simulated training data 306 can be generated to train the machine learning model 308. Many variations are possible.

FIG. 3B illustrates an example block diagram 330 associated with an approach to training a machine learning model for a scenario. The approach can include training a first machine learning model 336 based on simulated training data 332. The simulated training data 332 can be generated from training data for a symmetric scenario. A second machine learning model 338 can be trained based on labeled training data 334. As illustrated in FIG. 3B, there may be fewer instances of labeled training data 334 than instances of simulated training data 332. The second machine learning model 338 can be further trained based on application of portions of the first machine learning model 336. Parameters and weights 340 from the first machine learning model 336 can be applied to the second machine learning model 338. As illustrated in this example, the second machine learning model 338 can be trained in cases where instances of labeled training data 334 may be less than other available training data, such as simulated training data 332 by applying portions from the first machine learning model 336 to further refine the second machine learning model 338. Many variations are possible.

FIG. 3C illustrates an example block diagram 360 associated with an approach to training a machine learning model for a scenario. The approach can include providing simulated training data 362 and unlabeled training data 364 to a machine learning model 366*a* for training. The machine learning model 366*a* can be trained, for example, to determine a first feature space associated with the simulated training data 362 and a second feature space associated with the unlabeled training data 364. The machine learning model 366*a* can be trained, for example, to convert instances of the simulated training data 362 from the first feature space to the second feature space. Once the machine learning model 366*a* is trained, the unlabeled training data 364 can be provided to the trained machine learning model 366*b* for evaluation. As illustrated in this example, the machine learning model 366*a* can be trained based on simulated training data 362 and unlabeled training data 364 to evaluate the unlabeled training data 364. Once trained, the trained machine learning model 366*b* can evaluate the unlabeled training data 364. Many variations are possible.

Figure 4A:
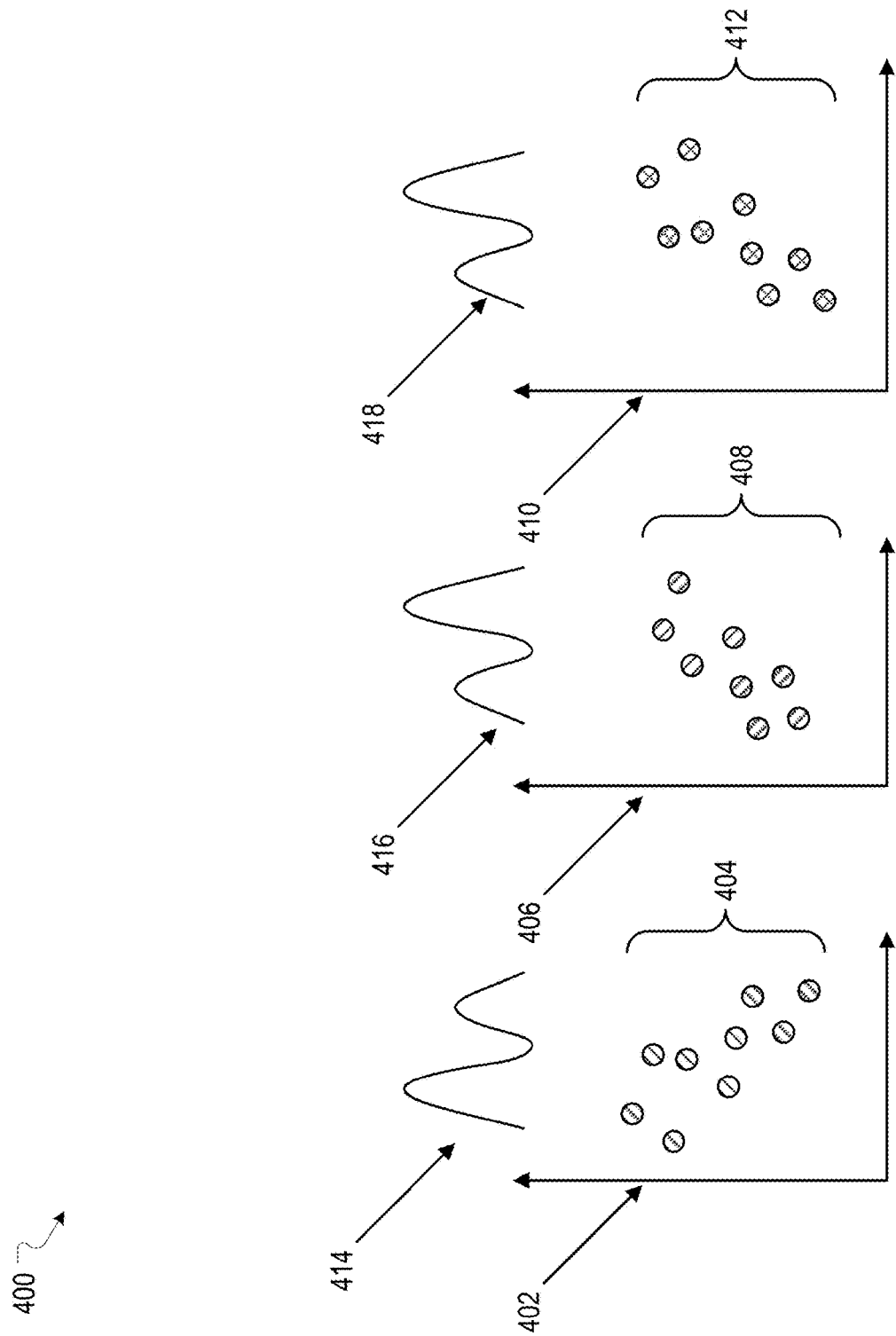
FIGS. 4A-4B illustrate example diagrams associated with machine learning applications in various scenarios, according to embodiments of the present technology.
Figure 4B:
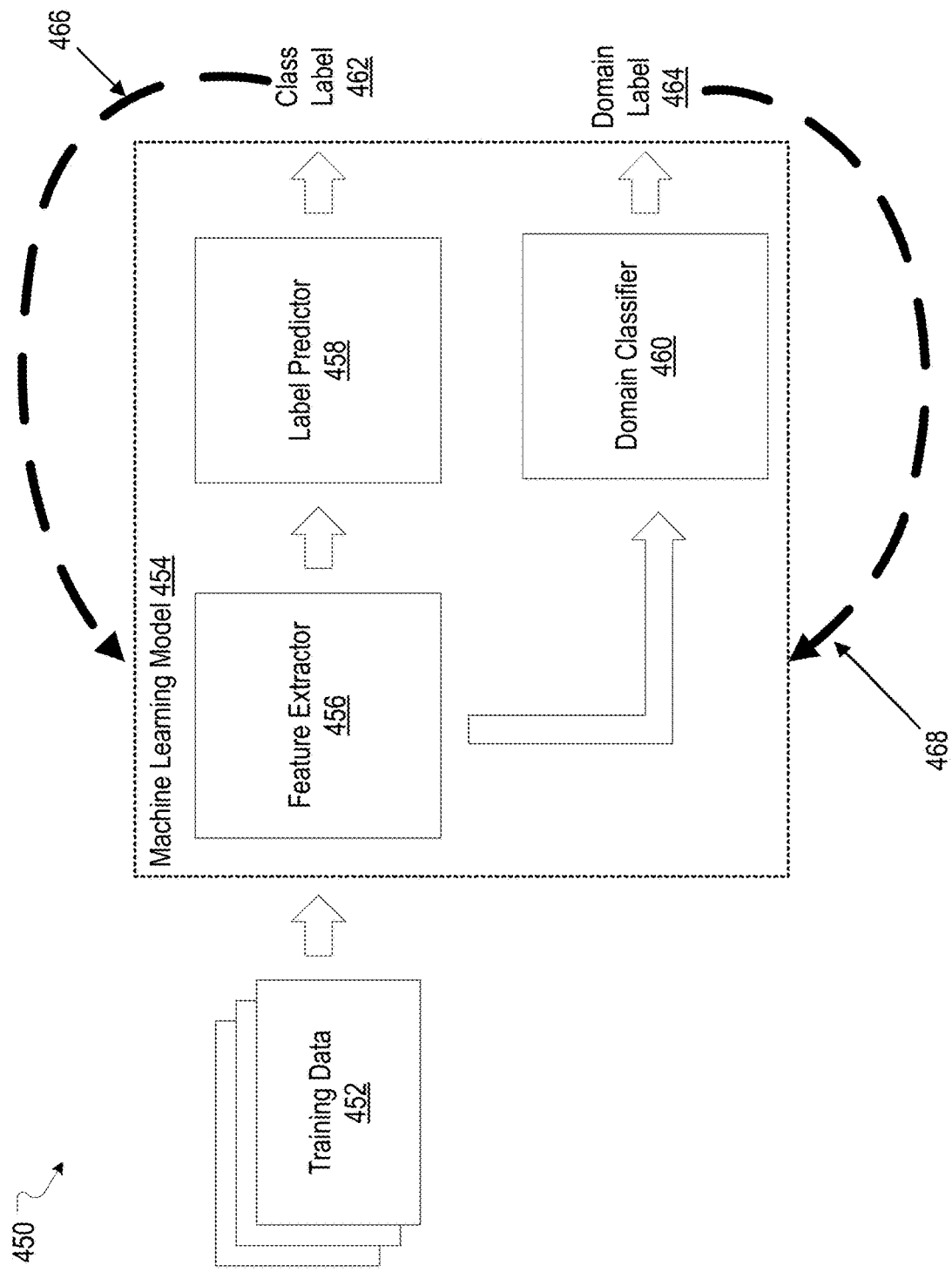

FIGS. 4A-4B illustrate example diagrams associated with machine learning applications in various scenarios, according to some embodiments of the present technology. The various functionality described herein for machine learning applications in various scenarios can be performed by, for example, the merge scenario module 102 of FIG. 1. It should be understood that there can be additional, fewer, or alternative functionality or steps performed in similar or alternative orders, or in parallel, based on the various features and embodiments discussed herein unless otherwise stated.

FIG. 4A illustrates an approach to training a machine learning model for a scenario. The approach can include training the machine learning model based on instances of simulated training data 404 and instances of unlabeled training data 408. The machine learning model can be trained based on the instances of simulated training data 404. The machine learning model can be trained to determine a transformation that converts instances of the simulated training data 404 associated with a first feature space 402 to a second feature space 406 associated with the instances of unlabeled training data 408. Determining the transformation can involve minimizing differences between a first feature distribution 414 for the first feature space 402 and a second feature distribution 416 for the second feature space 408. Minimizing the differences between the first feature distribution 414 for the first feature space 402 and the second feature distribution 416 for the second feature space 408 can involve, for example, minimizing a maximum mean discrepancy between the first feature distribution 414 and the second feature distribution 416. As illustrated in FIG. 4A, applying the transformation to the simulated training data 404 can illustrate how the differences between the instances of simulated training data 404 and the instances of unlabeled training data 408 are minimized. Instances of training data 412 can be a result of the transformation applied to the instances of simulated training data 404. The instances of training data 412 can be mapped in a feature space 410, which can be the same feature space as the second feature space 406. As illustrated in FIG. 4A, a feature distribution 418 for the feature space 410 is closer to the second feature distribution 416 than the first feature distribution 414. Many variations are possible.

FIG. 4B illustrates an approach to training a machine learning model 454 for a scenario. The approach can include training the machine learning model 454 based on instances of training data 452. The machine learning model 454 can include a feature extractor 456, a label predictor 458, and a domain classifier 460. The feature extractor 456 of the machine learning model 454 can extract features from the instances of training data 452. The label predictor 458 can predict labels for the instances of training data 452 based on the features extracted by the feature extractor 456. Class labels 462 can be generated based on the labels predicted by the label predictor 458. The class labels 462 can be back-propagated 466 and the machine learning model 454 can be trained to minimize a class label prediction loss. The domain classifier 460 can classify the instances of training data 452 into domains based on the features extracted by the feature extractor 456. Domain labels 464 can be generated based on the classification by the domain classifier 460. The domain labels 464 can be backpropagated 468 and the machine learning model 454 can be trained to minimize a domain classification loss. Many variations are possible.

Figure 5:
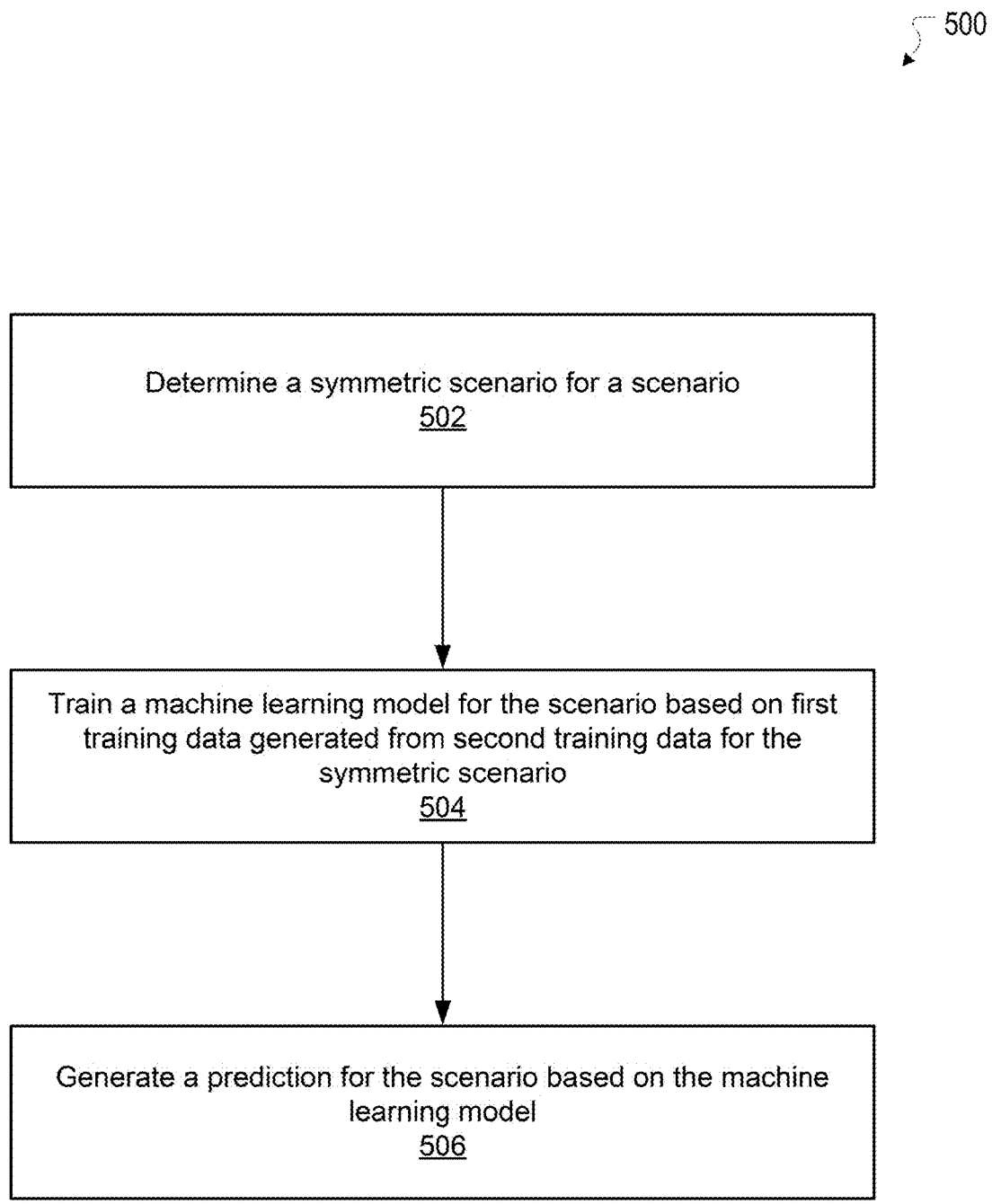
FIG. 5 illustrates an example method, according to embodiments of the present technology.

FIG. 5 illustrates an example method 500, according to embodiments of the present technology. At block 502, the example method 500 determines a symmetric scenario for a scenario. At block 504, the example method 500 trains a machine learning model based on first training data generated from second training data for the symmetric scenario. At block 506, the example method 500 generates a prediction for the scenario based on the machine learning model. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
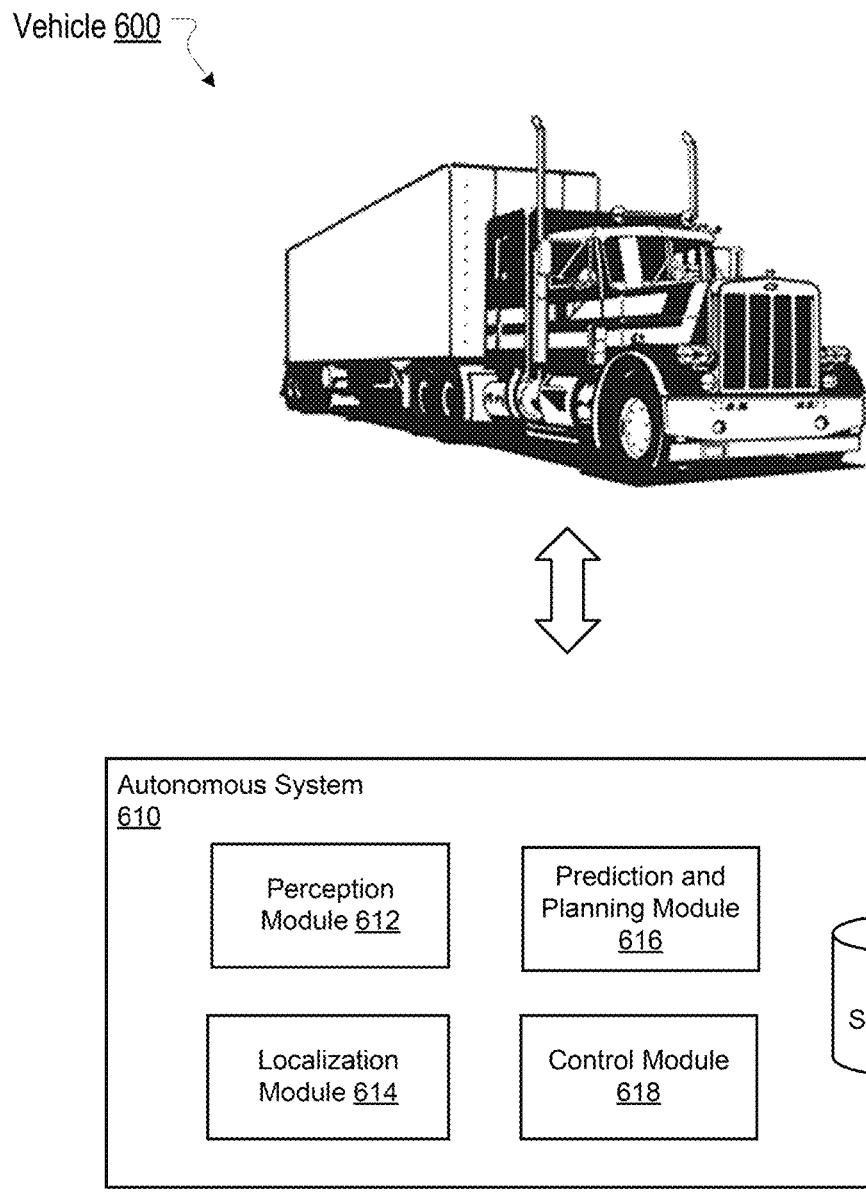
FIG. 6 illustrates an example vehicle, according to embodiments of the present technology.

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 812 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is travelling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 800 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system 610. The information can include, for example, instructions to perform the functionality of the autonomous system 610, data captured by sensors, data received from a remote computing system, parameter values reflecting vehicle states, localization data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular. In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
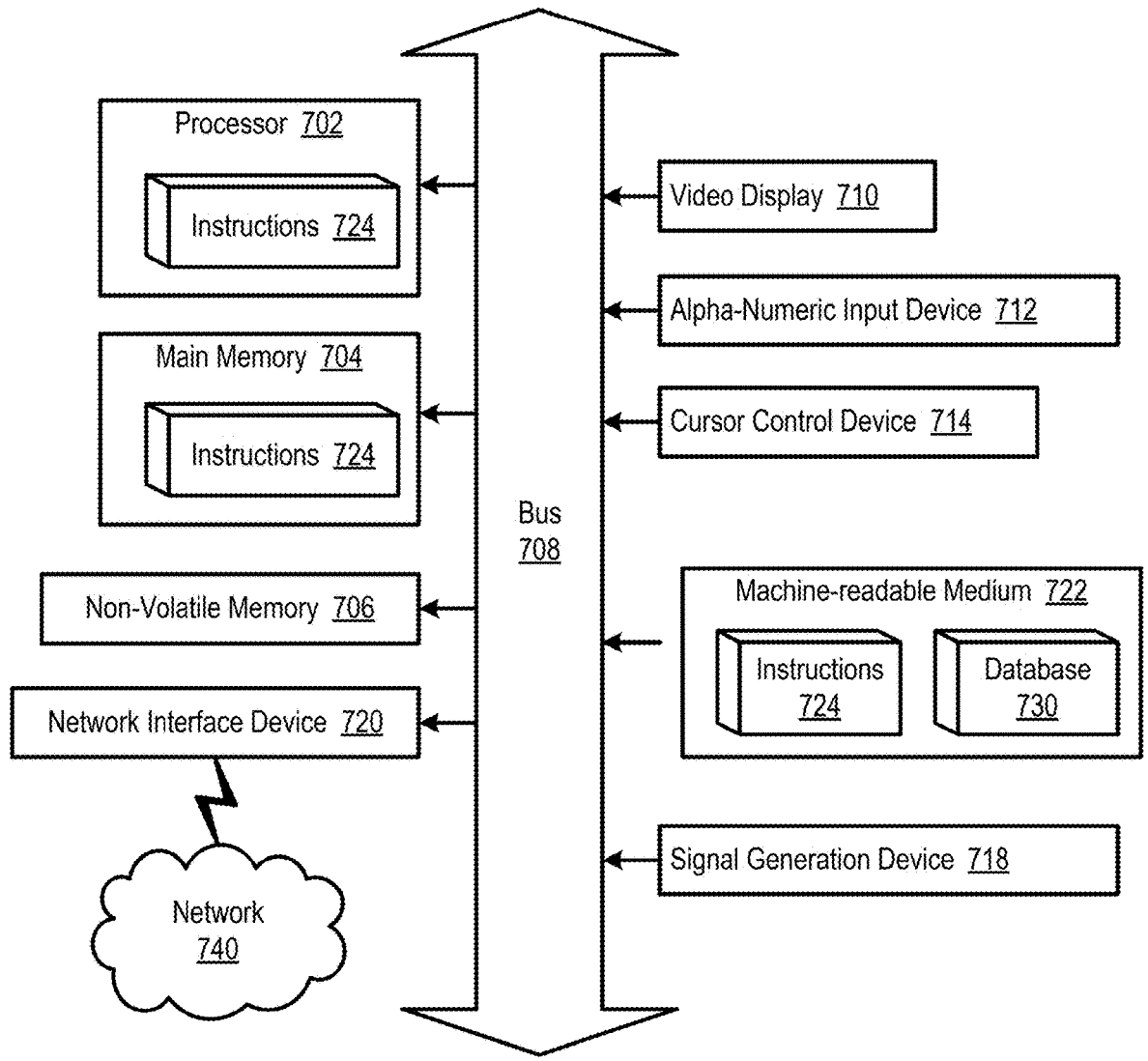
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. The machine-readable medium 722 on which is stored one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 922 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
    training, by a computing system, a first machine learning model for a scenario based on first training data that includes captured data associated with the scenario;
    applying, by the computing system, a first portion of a second machine learning model to the first machine learning model, wherein the second machine learning model is trained based on second training data that includes relabeled data associated with a symmetric scenario; and
    generating, by the computing system, a prediction for the scenario based on the first machine learning model, wherein driving of a vehicle is controlled based on the prediction.

2. The computer-implemented method of claim 1, wherein applying the first portion of the second machine learning model to the first machine learning model comprises:
    replacing, by the computing system, at least one of: a first parameter of the first machine learning model with a second parameter of the second machine learning model, a first weight of the first machine learning model with a second weight of the second machine learning model, and a first layer of the first machine learning model with a second layer of the second machine learning model.

3. The computer-implemented method of claim 1, wherein applying the first portion of the second machine learning model to the first machine learning model comprises:
    altering, by the computing system, at least one of: a first parameter of the first machine learning model based on an average of the first parameter with a second parameter of the second machine learning model, and a first weight of the first machine learning model based on an average of the first weight with a second weight of the second machine learning model.

4. The computer-implemented method of claim 1, further comprising:
    evaluating, by the computing system, the first machine learning model based on a comparison of predictions generated by the first machine learning model with labels associated with the captured data; and
    applying, by the computing system, a second portion of the second machine learning model to the first machine learning model to minimize a loss function between the predictions generated by the first machine learning model and the labels associated with the captured data.

5. The computer-implemented method of claim 1, wherein applying the first portion of the second machine learning model to the first machine learning model is based on a determination of an insufficient amount of the captured data.

6. The computer-implemented method of claim 1, wherein applying the first portion of the second machine learning model to the first machine learning model is based on transfer learning.

7. The computer-implemented method of claim 1, wherein the first portion of the second machine learning model corresponds with a second portion of the first machine learning model, and wherein the first machine learning model and the second machine learning model are associated with a same architecture.

8. The computer-implemented method of claim 1, wherein a first number of instances of the second training data is greater than a second number of instances of the first training data.

9. The computer-implemented method of claim 1, wherein the captured data is labeled to identify features in the captured data and to indicate outcomes related to the captured data.

10. The computer-implemented method of claim 1, wherein the scenario is an active merge scenario and the symmetric scenario is a passive merge scenario or wherein the scenario is a passive merge scenario and the symmetric scenario is an active merge scenario.

11. A system comprising:
    at least one processor; and
    a memory storing instructions that, when executed, cause the system to perform operations comprising:
        training a first machine learning model for a scenario based on first training data that includes captured data associated with the scenario;
        applying a first portion of a second machine learning model to the first machine learning model, wherein the second machine learning model is trained based on second training data that includes relabeled data associated with a symmetric scenario; and
        generating a prediction for the scenario based on the first machine learning model, wherein driving of a vehicle is controlled based on the prediction.

12. The system of claim 11, wherein applying the first portion of the second machine learning model to the first machine learning model comprises:
    replacing at least one of: a first parameter of the first machine learning model with a second parameter of the second machine learning model, a first weight of the first machine learning model with a second weight of the second machine learning model, and a first layer of the first machine learning model with a second layer of the second machine learning model.

13. The system of claim 11, wherein applying the first portion of the second machine learning model to the first machine learning model comprises:
    altering at least one of: a first parameter of the first machine learning model based on an average of the first parameter with a second parameter of the second machine learning model, and a first weight of the first machine learning model based on an average of the first weight with a second weight of the second machine learning model.

14. The system of claim 11, further comprising:
evaluating the first machine learning model based on a comparison of predictions generated by the first machine learning model with labels associated with the captured data; and
applying a second portion of the second machine learning model to the first machine learning model to minimize a loss function between the predictions generated by the first machine learning model and the labels associated with the captured data.

15. The system of claim 11, wherein applying the first portion of the second machine learning model to the first machine learning model is based on a determination of an insufficient amount of the captured data.

16. A non-transitory computer-readable storage medium including instructions that, when executed, cause a computing system to perform operations comprising:
training a first machine learning model for a scenario based on first training data that includes captured data associated with the scenario;
applying a first portion of a second machine learning model to the first machine learning model, wherein the second machine learning model is trained based on second training data that includes relabeled data associated with a symmetric scenario; and
generating a prediction for the scenario based on the first machine learning model, wherein driving of a vehicle is controlled based on the prediction.

17. The non-transitory computer-readable storage medium of claim 16, wherein applying the first portion of the second machine learning model to the first machine learning model comprises:
replacing at least one of: a first parameter of the first machine learning model with a second parameter of the second machine learning model, a first weight of the first machine learning model with a second weight of the second machine learning model, and a first layer of the first machine learning model with a second layer of the second machine learning model.

18. The non-transitory computer-readable storage medium of claim 16, wherein applying the first portion of the second machine learning model to the first machine learning model comprises:
altering at least one of: a first parameter of the first machine learning model based on an average of the first parameter with a second parameter of the second machine learning model, and a first weight of the first machine learning model based on an average of the first weight with a second weight of the second machine learning model.

19. The non-transitory computer-readable storage medium of claim 16, further comprising:
evaluating the first machine learning model based on a comparison of predictions generated by the first machine learning model with labels associated with the captured data; and
applying a second portion of the second machine learning model to the first machine learning model to minimize a loss function between the predictions generated by the first machine learning model and the labels associated with the captured data.

20. The non-transitory computer-readable storage medium of claim 16, wherein applying the first portion of the second machine learning model to the first machine learning model is based on a determination of an insufficient amount of the captured data.

* * * * *